Patented Jan. 2, 1945

2,366,616

UNITED STATES PATENT OFFICE 2,366,616

AZO INTERMEDIATES

Charles J. Harrington, Wilmington, Del., assignor to E. I. du Pont de Nemours & Company, Wilmington, Del., a corporation of Delaware No Drawing. Application May 2, 1942,
Serial No. 441,477

11 Claims. (Cl. 260—310)

This invention relates to processes for the manufacture of nitroaryl hydrazones of beta-keto esters or the corresponding pyrazolone derivatives. In this specification I will use the terms "hydrazone" and "pyrazolone" as brief terms for these classes of compounds.

The pyrazolones which are prepared by these processes have the general structure represented by the formula:

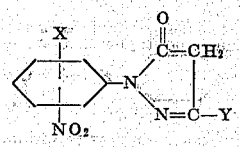

or the tautomeric form, in which the

group is represented as

Some of the hydrazones may be isolated as intermediate products having the general formula:

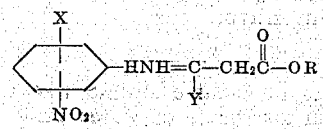

In these formulae X is one or more of the common substituents which are found on aryl nuclei, such as alkyl, sulfonic acid, halogen, carboxylic acid, hydroxy, nitro, and

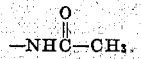

Y is from the group alkyl, carboxy, or carboxy alkyl, and R is alkyl. Exemplary of such are the nitro-aryl-hydrazones of oxal-acetic-acid-mono-ethyl ester.

One of the useful products which can be produced by my processes, the p-nitro-phenyl-hydrazone of oxal-acetic-acid-mono-ethyl ester, has been made before by other means, but the former processes are difficult of manipulation and inefficient in yield.

It is an object of this invention to make hydrazones and pyrazolones by processes which are technically efficient and economically satisfactory.

The objects of the invention are accomplished by a process, or processes, in which a selected nitroarylamine is diazotized to produce a diazonium salt; the diazonium salt is converted to alkali salt of a nitroaryl-hydrazine-sulfonic acid by reaction with a mixture of alkali sulfite and alkali bisulfite; these sulfonic acid salts are then, in distinction from prior processes which require their substantially complete hydrolysis before condensation, condensed directly with a keto-carboxylic acid ester in strong mineral acid medium to produce either a hydrazone or the corresponding pyrazolones, depending on whether or not the hydrazone rings close to the pyrazolone in the acid medium of the bath or require further treatment to close the rings. In cases where ring closure does not take place in acid medium, the hydrazone may be ring closed in alkaline medium. Briefly and generally described, in other terms, the steps of the reaction are these: (1) diazotization of the nitroarylamine; (2) reaction of (1) with sulfite and bisulfite; (3) adding acid enough to (2) so that the alkali of (4) will not injure the component of (2); (4) if a diethyl ester is used, it must be partly saponified with alkali; (5) four and three are reacted together; (6) strong acid is added to (5) until the concentration of acid reaches an optimum; (7) the product is isolated by filtration; (8) if the ring closes in alkaline and not in acid bath, the filtered material is dissolved in NaOH to close the ring; and (9) the ring closed compound, being insoluble in acid, is precipitated by acidification and isolated by filtration.

The primary arylamines used to produce the particular type of compounds which form the preferred products of my process are represented by the formula:

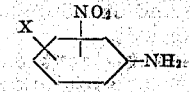

in which X is as defined hereinabove.

The keto carboxylic acid esters used in the process of the invention are of the type:

in which Y and R are as defined above. They are called beta-keto-carboxylic-acid esters herein. All the beta-keto esters may be used directly as such, but in the case of reactions involving beta-keto esters in which the substituent Y is a carboxylic ester group it is frequently desirable to produce a hydrazone or a pyrazolone in which the substituent Y is a free carboxylic acid group instead of an ester group. In such cases it is advantageous to convert the group Y on the beta-keto ester from a carboxylic acid ester to a free carboxylic acid by hydrolysis before the compound is reacted with the hydrazine sulfonate. This is accomplished by reacting the diester with sodium hydroxide in solution. The hydrolysis may, less desirably, be carried out after the formation of the keto-pyrazoline.

Although processes of diazotization are well-known, a satisfactory one for use in my process is as follows: A nitro-arylamine of the type described is diazotized in an excess of mineral acid with sodium nitrite solution. Hydrochloric acid is the preferred mineral acid and is used in the amount of about 2.5 mols of hydrochloric acid per mol of the amine. The sodium nitrite is preferably added as a solution of 25 to 40% by weight in an amount which is slightly in excess of one mol of nitrite per mol of amine. The temperature is preferably kept below 10° C.

The diazonium salt solution which has been so prepared is neutralized with a mild base so that it shows faint acidity on Congo red paper. Sodium bicarbonate is an excellent neutralizer but is only representative of other mild bases such as alkali carbonates, alkali bicarbonates, oxides, carbonates of magnesium and calcium and weak organic acid salts of these metals, such as sodium acetate. The neutralization is preferably carried out in the cold, a satisfactory temperature being under 10° C. but higher temperatures may be used without disadvantage in connection with particular salts.

The neutralized diazonium salt solution is mixed with a solution of ammonium, sodium, or potassium bisulfite and ammonium, sodium, or potassium sulfite. This mixture may be made by the use of bisulfite and alkali or by the use of sulfite and acid, or by mixing sulfite and bisulfite together. The reaction between the neutralized salt and the mixture of sulfite and bisulfite preferably takes place in the cold, temperatures from 5-15° C. being satisfactory, but temperatures up to 25° C. or beyond are not deleterious with certain compounds. The bisulfite and the sulfite should each be in excess of one mol per mol of amine, and the excess should be sufficient to keep the pH of the solution acid to litmus and neutral to Congo red paper during the addition of the diazonium salt solution. The reaction should be carried out with good agitation and the mixing of the two solutions should not take longer than it takes the solution to turn acid to Congo red spontaneously. This time will vary with the temperature, with the concentration of sulfite and bisulfite and with the particular diazonium salt.

It is preferable at this point to add some strong mineral acid, such as sulfuric acid, to the solution of the dialkali-disulfonate in order to convert or partially convert it to the monosulfonate and, in cases where alkaline hydrolysis of the beta-keto-dicarboxylic esters has been made, to neutralize the alkali salts of these esters.

To the mixture of hydrazine sulfonic acids formed by the foregoing process is added the keto-carboxylic acid ester or its alkali complex and strong mineral acids, such as sulfuric or hydrochloric acid. The keto-carboxylic acid should be present in an excess of about 10-20% per mol of hydrazine sulfonate. Lesser amounts decrease the yield and quality but greater amounts may be used without inefficiency. The amounts of mineral acid which are added and the temperatures used vary widely with the individual ketone and the individual hydrazine sulfonate.

This process is represented by the following reactions:

1. Diazotization:

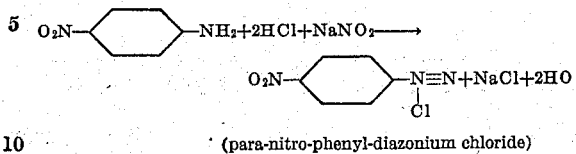

(para-nitro-phenyl-diazonium chloride)

2. Reaction with sulfite and bisulfite:

Para-nitro-phenyl-diazonium chloride+$NaHSO_3$+$Na_2SO_3$ ⟶

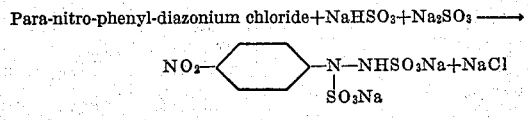

(p-nitro-phenyl-hydrazine-disodium-disulfonate)

3. Saponification of sodium-diethyl-oxal-acetate:

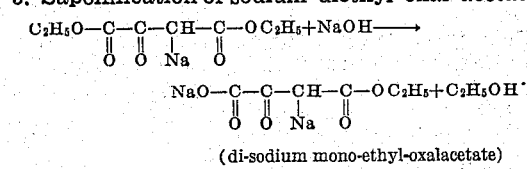

(di-sodium mono-ethyl-oxalacetate)

4. Condensation:

Add mineral acid to the hydrazine disulfonate and combine p-nitro-phenyl-hydrazine mono-sodium sulfonate+
di-sodium-mono-ethyl-oxalacetate ⟶

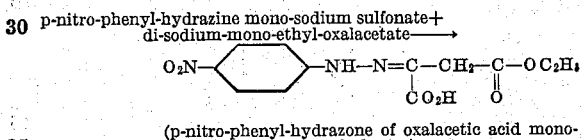

(p-nitro-phenyl-hydrazone of oxalacetic acid mono-ethyl ester)

5. In cases where the ring has not closed, alkali produced the ring by this reaction:

p-nitro-phenyl-hydrazone of oxalacetic acid mono-ethyl ester+

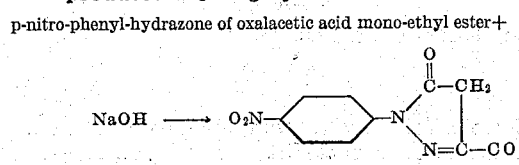

The following examples illustrate but do not limit the invention.

*Example I*

138 parts of p-nitro-aniline was thoroughly mixed with 200 parts of water until a smooth paste was obtained. To this paste was added 300 parts of 31% hydrochloric acid and 300 parts of ice. The mixture was agitated in an ice bath as 230 parts of 30% sodium nitrite was added over a period of about two minutes during which time the temperature rose from —5° C. to 10° C. Agitation was continued for about an hour at 5° to 10° C.

While the diazonium chloride solution was being agitated the following mixture was prepared: 150 parts of 30% sodium hydroxide was added to 650 parts of a 38% solution of sodium bisulfite. This suspension of sodium sulfite and bisulfite was cooled to 15° C. with external cooling. The diazonium chloride solution was carefully neutralized with finely ground sodium bicarbonate in small portions, until the solution gave only faint brown streaks on Congo red paper.

This neutralized solution was added to the well agitated mixture of sodium sulfite and bisulfite over a period of about twenty minutes, the temperature being maintained at 15° to 20° C., and the pH checked to make sure the solution was at all times neutral to Congo red and acid to the blue litmus papers. The resulting golden yellow solution was allowed to warm to room temperature.

230 parts of the sodium salt of the diethyl ester of oxal-acetic acid was added to a well-agitated mixture of 320 parts of water and 160 parts of 30% sodium hydroxide at 20°-25° C. The addition of the ester was made as rapidly as possible while maintaining the temperature between those limits. The time was not over 5 minutes. Agitation was continued for a further 15 minutes at 20°-25° C. The product is called the disodium salt of oxal-ethyl-acetate.

During this period of agitation 400 pts. of 98% sulfuric acid were added slowly with agitation to the hydrazine sulfonate solution and the temperature held to 40° C.±2 with external cooling.

At the end of the 15 minute agitation period the partially saponified oxal-acetic ester solution was poured rapidly into the agitated hydrazine sulfonate solution. Immediately after this addition 1200 parts of 98% sulfuric acid was added as rapidly as possible, the temperature rose to above 90° C., and the mass rapidly became very thick. Agitation was continued for 2 hours, then 300 parts of water were added, the mass was cooled to room temperature and filtered with suction. The filter cake was washed with about 3000 parts of water.

The product consisted of a mixture of a small amount of 1-p-nitro-phenyl-5-pyrazolone-3-carboxylic acid and a large amount of the p-nitrophenyl-hydrazone of oxalacetic-acid-mono-ethyl ester.

The hydrazone was readily converted to the pyrazolone by dissolving it in a solution of 40 parts of sodium hydroxide at room temperature and reprecipitating with acid. It came down as an extremely gelatinous precipitate which was recrystallized on a small scale in water with decolorizing charcoal in proportions of about 300 parts of water to 1 of the pyrazoline, to give a product melting sharply at 233° C. A yield of about 80% of the pure compound was obtained.

*Example II*

300 parts of meta-nitro-aniline (technical) was slurried with 1200 parts of water and cooled below 5° C. with brine coils. Then 368 parts of 72% sulfuric acid was added slowly and the temperature reduced to 0° C. 600 parts of ice were added and then rapidly with agitation 514 parts of 30% sodium nitrite solution. Agitation was continued for a half an hour as the temperature was maintained below 15° C.

864 parts of 100% sodium sulfite in the form of hydrated crystals were mixed with 1800 parts of water. Then 107 parts of 72% sulfuric acid was added slowly to the mixture. The mixture was cooled to 50° C. with ice, and then the diazo solution above added within 10 minutes at a temperature of 10° to 15° C. with agitation. Agitation was continued for one and one-half hours as the temperature was allowed to rise to 25° C. The resulting solution was then clarified in a press.

The filtrate was heated to 48° C. and then to it was added slowly 1200 parts of 72% sulfuric acid.

While clarification was proceeding a solution of di-sodium-mono-ethyl-oxal-acetate was made up as follows. 225 parts water, 100 parts of ice, 348 parts of 30% sodium hydroxide, and 518 parts of sodium diethyl oxalacetate (100%) were mixed together and agitated at 25°-30° C. for one half an hour.

Within five minutes after the addition of the acid to the reduction charge the above solution of di-sodium mono-ethyl-oxalacetate was added rapidly to it. Immediately 4300 parts of 72% sulfuric acid was added within a period of about two minutes. The temperature rose to about 65° C. on this addition. The charge was then agitated for one and one-half hours at 65° C. It was then cooled to 30° C., and the precipitate was filtered off and washed with water.

*Example III*

17.25 parts of p-nitro-aniline was pasted with 25 parts of water and then mixed with 37 parts of 31% hydrochloric acid. To this mixture was added 37 parts of ice. 29 parts of 30% sodium nitrite were then added rapidly with agitation, and the solution was agitated for an hour at 5°-10° C.

This solution after neutralization with sodium bicarbonate was added over a period of 20 minutes to a previously prepared mixture of 100 parts of 38% sodium bisulfite and 20 parts of 30% sodium hydroxide at 15°-20° C.

The resulting solution was heated to 60° C. and held until the hydrazine sulfonate began to separate and was then cooled rapidly to 25° C. To this agitated mixture was added 20 parts of ethyl-aceto-acetate (technical) and then 65 parts of 37% hydrochloric acid. This mixture was agitated at 25° C. for a period of eight hours, by which time there was a light buff-colored precipitate.

This was filtered from the mother liquor and dried. There was gained 25 parts of a material melting at 218° C. In this case this was the pyrazolone. This product may be dissolved in dilute sodium hydroxide and clarified and recrystallized. The true melting point was about 225° C.

Diazotization of the amines may be carried out in any of the several familiar methods described in the literature.

Neutralization of the diazonium salt is usually desirable particularly with strongly negatively substituted amines, but is not always essential and may be avoided if the sulfite bisulfite mixture is properly balanced.

The conditions for carrying out the final condensation vary so widely with the specific components that it is difficult to make generalizations, except that in many cases very high mineral acid concentrations are favorable.

It has been demonstrated, by following the rate of hydrolysis of nitro-phenyl-hydrazine sulfonic acids by spotting on filter paper, that the disappearance of the sulfonic acid is many times faster in the presence of a ketone than in its absence, acid concentration and temperature being the same. It thus can be reasonably assumed that there is a direct chemical reaction between the sulfonic acid and the ketone, and that the reaction is not merely a hydrolysis of the sulfonic acid with a subsequent condensation with the ketone. This is, of course, a matter of theory, and does not affect the operability of the invention or the physical steps or additions involved.

The process described above is of advantage in preparing a number of otherwise difficultly obtainable hydrazones and pyrazolones which are valuable dye intermediates. It allows the preparation of these products in remarkably high yields by a process in which there are practically no intermediate isolation steps. The reaction is one which gives an unexpected result, in that keto-carboxylic acid esters are unstable in the presence of mineral acids, and it could not be anticipated by reference to the literature that reaction of the keto ester and the hydrazine sulfonic acid would take place at all, let alone take place more rapidly than the decomposition of the keto-carboxylic acid ester. According to the methods described in the literature, the hydrazine sulfonic acids are hydrolyzed to the hydrazine before the condensation is made with keto esters.

As many apparently widely different embodiments of this invention may be made without departing from the spirit and scope thereof, it is to be understood that I do not limit myself to the specific embodiments thereof except as defined in the appended claims.

I claim:

1. The process of making a nitro-phenyl-pyrazolone-carboxylic acid which comprises reacting para-nitro-benzene diazonium chloride with a sulfite and a bisulfite, reacting the diethyl ester of oxal-acetic acid with NaOH in solution at 20–25° C. to produce the disodium salt of oxal-ethyl acetate, reacting the said disodium salt with the product of the sulfite-bisulfite reaction in the presence of sulfuric acid in sufficient amount to cause the formation of the para-nitro-phenyl-hydrazone of oxalacetic acid at a temperature about 90° C. with agitation, filtering off and dissolving the product in alkali solution and precipitating the pyrazolone with acid.

2. The process of making a nitro-phenyl-pyrazolone-carboxylic acid which comprises reacting a nitro-phenyl-diazonium chloride with a sulfite and a bisulfite, reacting the product of that reaction with the sodium salt of an ethyl ester of oxal-acetic acid in the presence of enough sulfuric acid to form the hydrazone of oxalacetic acid and at temperature elevated to less than 100° C. with agitation, closing the ring of the compound by the action of alkali, and isolating the pyrazolone.

3. The process of making a nitro-phenyl-pyrazolone-carboxylic acid which comprises reacting a nitro-phenyl-diazonium chloride with a sulfite and a bisulfite, reacting the product of that reaction with the sodium salt of an ethyl ester of oxal-acetic acid in the presence of enough acid to form the hydrazone of oxalacetic acid, and at temperature elevated to less than 100° C. with agitation, and isolating the pyrazolone.

4. The process for the manufacture of p-nitrophenyl-pyrazolone carboxylic acid represented by the formula:

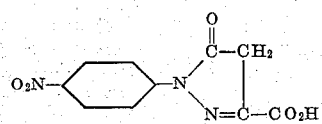

which comprises adding a solution of disodium monoethyl oxalacetate to an acidified solution of p-nitro-phenyl-hydrazine sulfonic acid prepared by reducing a solution of p-nitro-phenyl-diazonium chloride with a sulfite and a bisulfite mixture, adding sulfuric acid in sufficient amount to cause the formation of p-nitro-phenyl-hydrazone of oxalacetic acid at a temperature under 100° C., filtering off the hydrazone compound, and treating it with alkali to form the pyrazolone.

5. The process for the manufacture of nitrophenyl-pyrazolone carboxylic acid which comprises mixing an acidified nitrophenyl hydrazine sulfonic acid solution (prepared by reducing with a mixture of sulfite and bisulfite a solution of nitro-phenyl diazonium salt of a mineral acid), with a solution of disodium monoethyl oxalacetate, and adding sulfuric acid to the mixture in sufficient amount to cause the formation of the nitro-phenyl-hydrazone of monoethyl oxalacetic acid

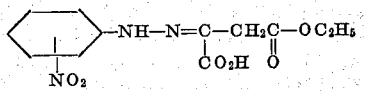

at a temperature under 100° C., filtering off the hydrazone and treating it with alkali to form the pyrazolone,

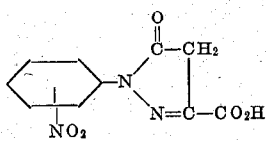

and precipitating the alkali salt with acid.

6. The process for the manufacture of nitrophenyl-pyrazolone carboxylic acid which comprises mixing an acidified nitro-phenyl-hydrazine sulfonic acid solution (prepared by reducing with a mixture of sulfite and bisulfite a solution of nitro-phenyl diazonium salt of a mineral acid), with a solution of disodium monoethyl oxalacetate, and adding sulfuric acid to the mixture in sufficient amount to cause the formation of the pyrazolone, represented by the formula shown in claim 5, at a temperature under 100° C.

7. The process for the manufacture of nitrophenyl-pyrazolone carboxylic acid represented by the formula shown in claim 5, which comprises adding to an acidified mixture of nitro-phenyl-hydrazine mono and disulfonic acid, a solution of disodium mono-alkyl-oxalacetate, adding sufficient mineral acid to the mixture to cause the formation of the nitro-phenyl-hydrazone of mono-alkyl-oxalacetic acid,

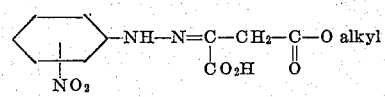

at a temperature under 100° C., filtering off the hydrazone and treating it with alkali to form the pyrazolone.

8. The process for the manufacture of a nitrophenyl-methyl-pyrazolone represented by the formula:

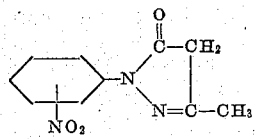

which comprises reacting ethyl-aceto-acetate with nitro-phenyl hydrazine sulfonic acid in the presence of sufficient mineral acid to cause the formation of the pyrazolone at a temperature under 100° C.

9. The process for the manufacture of a nitrophenyl-methyl-pyrazolone represented by the formula:

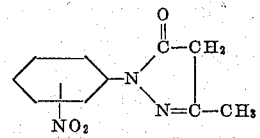

which comprises reacting ethyl-aceto-acetate with a mixture of nitro-phenyl-hydrazine mono and disulfonic acids in the presence of sufficient mineral acid to cause the formation of the pyrazolone at a temperature under 100° C.

10. The process for the manufacture of p-nitrophenyl-methyl-pyrazolone represented by the formula

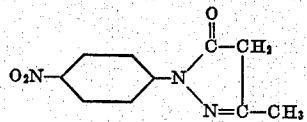

which comprises reacting ethyl-aceto-acetate with p-nitro-phenyl-hydrazine sulfonic acid in the presence of sufficient mineral acid to cause the formation of the pyrazolone at a temperature under 100° C.

11. The process for the manufacture of p-nitro-phenyl-methyl-pyrazolone represented by the formula:

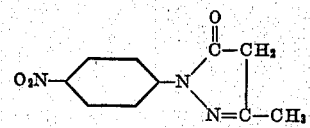

which comprises reacting ethyl-aceto-acetate with a mixture of p-nitro-phenyl-hydrazine mono and disulfonic acids in the presence of sufficient mineral acid to cause the formation of the pyrazolone at a temperature under 100° C.

CHARLES J. HARRINGTON.